United States Patent
Senofonte et al.

(10) Patent No.: US 10,125,723 B1
(45) Date of Patent: Nov. 13, 2018

(54) COIL SPRING HANGER FOR EXHAUST DUCT LINER

(71) Applicant: United Technologies Corporation, Farmington, CT (US)

(72) Inventors: Paul R. Senofonte, Jupiter, FL (US); Timothy J. McAlice, Jupiter, FL (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 16/036,130

(22) Filed: Jul. 16, 2018

Related U.S. Application Data

(62) Division of application No. 13/656,888, filed on Oct. 22, 2012, now Pat. No. 10,054,080.

(51) Int. Cl.
*F02K 1/80* (2006.01)
*F02K 1/82* (2006.01)

(52) U.S. Cl.
CPC .......... *F02K 1/822* (2013.01); *F05D 2250/25* (2013.01); *F05D 2260/30* (2013.01); *Y02T 50/675* (2013.01); *Y10T 29/49234* (2015.01)

(58) Field of Classification Search
CPC ... F01K 1/78; F01K 1/80; F01K 1/805; F01K 1/82; F01K 1/822; F02C 7/20; F23R 3/60; F16F 1/222; F16F 1/126; F05D 2250/25; F05D 2260/30; Y10T 29/49234; Y02T 50/675
USPC .......... 60/766, 761, 796, 797, 800; 138/114; 248/60; 278/178, 189
See application file for complete search history.

(56) References Cited

U.S. PATENT DOCUMENTS

| | | | |
|---|---|---|---|
| 2,795,108 A | 6/1957 | Saldin | |
| 3,007,312 A | 11/1961 | Shutts | |
| 3,102,706 A | 9/1963 | Goldsmith | |
| 3,121,995 A | 2/1964 | Albani | |
| 3,138,930 A * | 6/1964 | Waters | F23R 3/08 60/757 |
| 3,606,704 A | 9/1971 | Denton | |
| 3,826,088 A | 7/1974 | Nash et al. | |
| 3,866,417 A | 2/1975 | Velegol | |
| 4,526,508 A | 7/1985 | Antonellis et al. | |
| 4,848,089 A | 7/1989 | Cramer | |

(Continued)

FOREIGN PATENT DOCUMENTS

GB 906123 A 9/1962

*Primary Examiner* — William H Rodriguez
*Assistant Examiner* — Jason H Duger
(74) *Attorney, Agent, or Firm* — Carlson, Gaskey & Olds, P.C.

(57) ABSTRACT

A method includes providing an exhaust liner as a first duct, providing a second duct having an opening therein, and spacing the first duct radially inward of the second duct. A spring connects the first and second ducts together and has first and second ends. A first mount comprises a first bracket portion associated with the spring and a second bracket portion directly fixed to the first duct. The first bracket portion is directly fixed to the first end of the spring and the second end of the spring is fixed to a second mount that comprises a casing plate having an area greater than the opening. The first end of the spring and the first bracket portion are inserted through the opening and the first bracket portion is attached to the second bracket portion. The casing plate is directly fixed to a radially outward facing surface of the second duct.

10 Claims, 3 Drawing Sheets

(56) References Cited

U.S. PATENT DOCUMENTS

| | | |
|---|---|---|
| 4,864,818 A | 9/1989 | Taylor |
| 4,920,742 A | 5/1990 | Nash et al. |
| 4,971,005 A | 11/1990 | Dyer et al. |
| 5,059,055 A | 10/1991 | DeGress et al. |
| 5,333,443 A | 8/1994 | Halila |
| 5,592,814 A | 1/1997 | Palusis et al. |
| 6,102,610 A | 8/2000 | Palusis et al. |
| 6,199,371 B1 | 3/2001 | Brewer et al. |
| 7,017,334 B2 | 3/2006 | Mayer et al. |
| 7,089,748 B2 | 8/2006 | Tiemann |
| 7,581,399 B2 | 9/2009 | Farah et al. |
| 7,614,236 B2 | 11/2009 | Mandet et al. |
| 7,861,535 B2 | 1/2011 | Figueroa |
| 7,975,488 B2 | 7/2011 | Farah et al. |
| 8,104,290 B2 | 1/2012 | Ellis et al. |
| 8,171,719 B2 | 5/2012 | Ryan |
| 8,240,045 B2 | 8/2012 | Sutcu et al. |
| 2008/0022689 A1 | 1/2008 | Farah et al. |
| 2008/0050220 A1 | 2/2008 | Merry et al. |
| 2008/0158527 A1 | 7/2008 | Farah et al. |
| 2008/0236136 A1 | 10/2008 | Loffredo |
| 2009/0293498 A1 | 12/2009 | Petty et al. |
| 2009/0317175 A1 | 12/2009 | Martinez |
| 2012/0186269 A1 | 7/2012 | Cihlar et al. |
| 2012/0247250 A1 | 10/2012 | Karafillis et al. |
| 2014/0109592 A1 | 4/2014 | Senofonte |
| 2014/0123678 A1 | 5/2014 | Preston, III |
| 2014/0225380 A1 | 8/2014 | Gonidec |

\* cited by examiner

COIL SPRING HANGER FOR EXHAUST DUCT LINER

CROSS-REFERENCE TO RELATED APPLICATION

This application is a divisional of U.S. application Ser. No. 13/656,888, filed on Oct. 22, 2012.

BACKGROUND

A gas turbine engine typically includes a fan section, a compressor section, a combustor section, a turbine section, and in some configurations an augmenter section. A liner extending aft of the turbine section typically referred to as an exhaust or augmenter liner includes an inner liner exposed to hot exhaust gases. The inner liner is typically spaced from an outer structure with a plurality of hanger assemblies. The hanger assemblies are required to accommodate misalignment, complex shapes, large thermal growth differentials, significant pressure loads and high temperatures. Moreover, the hangers are positioned within a confined physical envelope that is difficult to access while accommodating relative movement within several planes simultaneously.

Accordingly, it is desirable to design and develop a reduced cost hanger that performs as desired in the harsh environment of the exhaust duct while also simplifying assembly and reducing cost.

SUMMARY

According to an embodiment disclosed herein, a method of supporting a liner of a gas turbine engine includes providing an exhaust liner comprising a first duct, providing a second duct having an opening therein, and spacing the first duct radially inward of the second duct. A spring connects the first and second ducts together and has first and second ends. A first mount comprises a first bracket portion associated with the spring and a second bracket portion directly fixed to the first duct. The first bracket portion is directly fixed to the first end of the spring and the second end of the spring is fixed to a second mount that comprises a casing plate having an area greater than the opening. The first end of the spring and the first bracket portion are inserted through the opening and the first bracket portion is attached to the second bracket portion. The casing plate is directly fixed to a radially outward facing surface of the second duct.

In a further embodiment of any of the foregoing embodiments, the first bracket portion comprises a bracket plate with a hole and the second bracket portion comprises a bracket body with a plurality of legs and at least one stud, and the method further comprises fixing the legs of the bracket body directly to the first duct, and inserting the bracket plate through the opening to receive the stud in the hole.

In a further embodiment of any of the foregoing embodiments, the casing plate has a central aperture therethrough, and the method includes aligning the central aperture with the opening, inserting a nut through the central aperture and opening, and attaching the nut to the stud.

In a further embodiment of any of the foregoing embodiments, the method includes covering the casing plate with a cover to minimize leakage through the central aperture.

In a further embodiment of any of the foregoing embodiments, the method includes forming at least one first attachment hole in the cover, forming at least one second attachment hole in the casing plate, forming at least one third attachment hole in the second duct, aligning the first, second, and third attachment holes, and inserting a fastener through the aligned first, second and third attachment holes.

In a further embodiment of any of the foregoing embodiments, the plurality of legs extend in one direction and the at least one stud extends in an opposite direction.

In a further embodiment of any of the foregoing embodiments, the spring defines a central axis and the method further includes forming a volume for cooling air flow between an outer surface of the exhaust liner and an inner surface of the second duct, and assembling the first mount, second mount, and spring to provide a hanger assembly that supports the exhaust liner relative to the second duct such that the spring couples the first and second ducts together such that the first and second ducts are moveable relative to each other in a first direction along the central axis and are moveable relative to each other in a second direction transverse to the central axis.

In a further embodiment of any of the foregoing embodiments, the method includes extending the spring in a radial direction across a cooling volume between the first and second ducts to connect the first and second ducts together.

In a further embodiment of any of the foregoing embodiments, the method includes sealing the opening in the second duct after coupling the first and second ducts together with the spring.

In a further embodiment of any of the foregoing embodiments, the spring defines a central axis and the method further comprises: providing a fan section with a plurality of fan blades rotatable about an engine axis; providing a compressor section in communication with the fan section; providing a combustor in fluid communication with the compressor section; providing a turbine section in fluid communication with the combustor and driving the fan section and the compressor section; locating the exhaust liner aft of the turbine section, wherein the exhaust liner includes an inner surface exposed to exhaust gases; forming a volume for cooling air flow between an outer surface of the exhaust liner and an inner surface of the second duct; and assembling the first mount, second mount, and spring to provide a hanger assembly supporting the exhaust liner relative to the second duct such that the spring couples the first and second ducts together such that the first and second ducts are moveable relative to each other in a first direction along the central axis and are moveable relative to each other in a second direction transverse to the central axis.

These and other features of this application will be best understood from the following specification and drawings, the following of which is a brief description.

DETAILED DESCRIPTION

Figure 1:
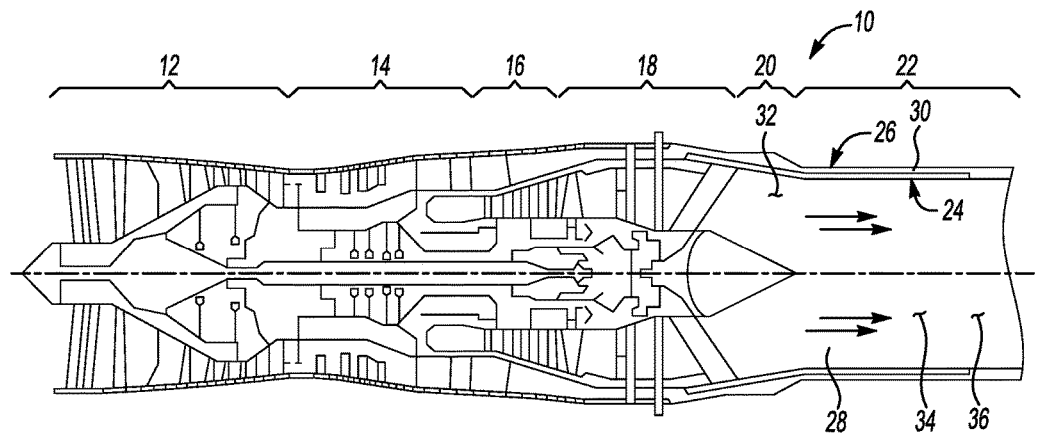
FIG. 1 shows a sectional view of a gas turbine engine incorporating an embodiment of a spring hanger shown herein.

Referring to FIG. 1, a gas turbine engine 10 includes a fan section 12, a compressor section 14, a combustor section 16, and a turbine section 18. Air entering into the fan section 12 is initially compressed and fed to the compressor section 14. In the compressor section 14, the incoming air from the fan section 12 is further compressed and communicated to the combustor section 16. In the combustor section 16, the compressed air is mixed with gas and ignited to generate a hot exhaust stream 28. The hot exhaust stream 28 is expanded through the turbine section 18 to drive the fan section 12 and the compressor section 14. In this example, the gas turbine engine 10 includes an augmenter section 20 where additional fuel can be mixed with the exhaust gasses 28 and ignited to generate additional thrust. The exhaust gasses 28 flow from the turbine section 18 and the augmenter section 20 through an exhaust liner assembly 22.

The example exhaust liner assembly 22 includes a liner 24 that defines an inner surface exposed to the hot exhaust gasses 28. The liner 24 (e.g., a first duct) is supported by a duct 26 (e.g., a second duct) disposed radially outward of the liner 24. An annular space 30 is disposed between the liner 24 and the duct 26 for a cooling airflow. The example exhaust liner assembly 22 includes a first section 32, a second section 34, and third section 36. Each of the first, second and third sections 32, 34, 36 are movable relative to each other to provide a thrust vectoring function. As appreciated, although the gas turbine engine 10 is disclosed and described by way of example and other configurations and architectures of gas turbine engines are within the contemplation of this disclosure and would benefit from the disclosures within this application.

Figure 2:
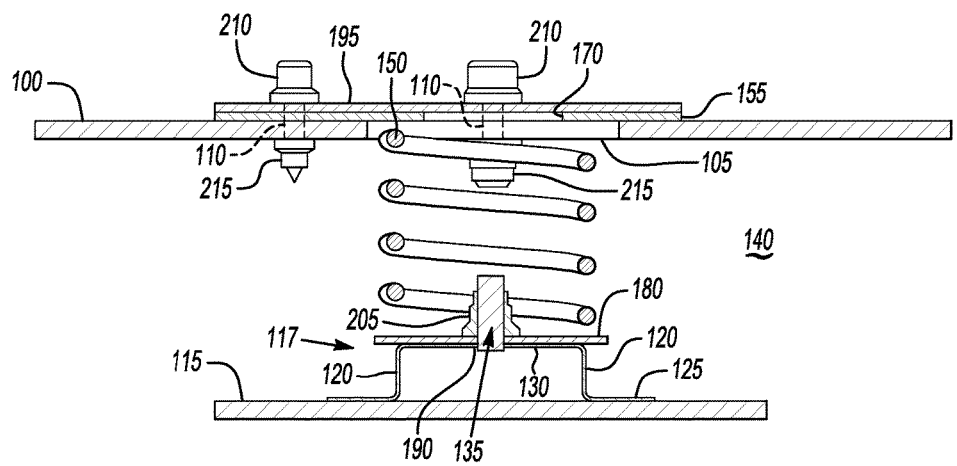
FIG. 2 is a side view partially in section proportion of the engine of Figure
Figure 3:
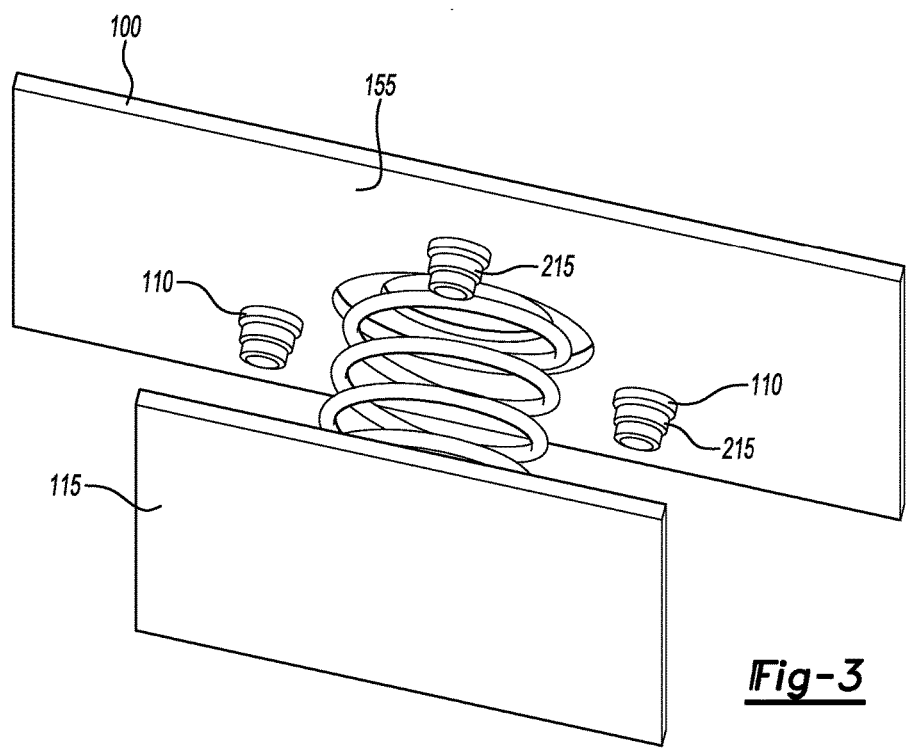
FIG. 3 is a sectional view in perspective of the hanger of FIG. 2.

Referring now to FIGS. 2 and 3, casing/duct 26/100 is shown having a major opening 105 and a plurality of attachment holes 110. Though three attachment holes 110 are shown herein, another number of attachment holes 110 may be used.

Figure 5:
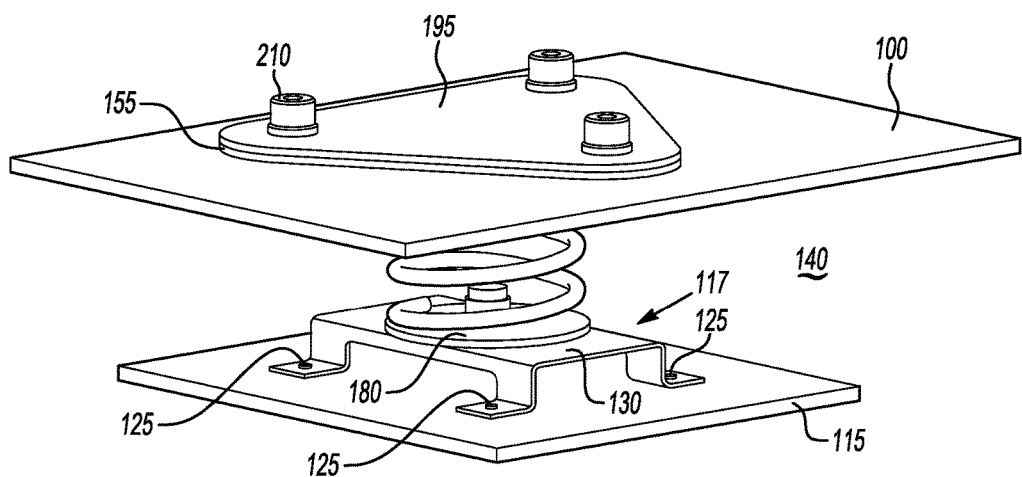
FIG. 5 is a perspective view partially in section of the hanger assembly of FIGS. 2 and 3.

A liner 24/115 is placed coaxially within the casing 26/100 the liner 24/115 has a bracket 117 attached thereto (see also FIG. 5). The bracket 117 has a plurality of L-shaped legs 120 that are riveted or the like through apertures 125 into liner 115.

The bracket 117 has a body 130 that is generally flat and has a stud 135 extending radially outwardly and perpendicularly from the body 130. The casing 100 and the liner 115 form a volume 140 therebetween through which cooling air flows.

Figure 4:
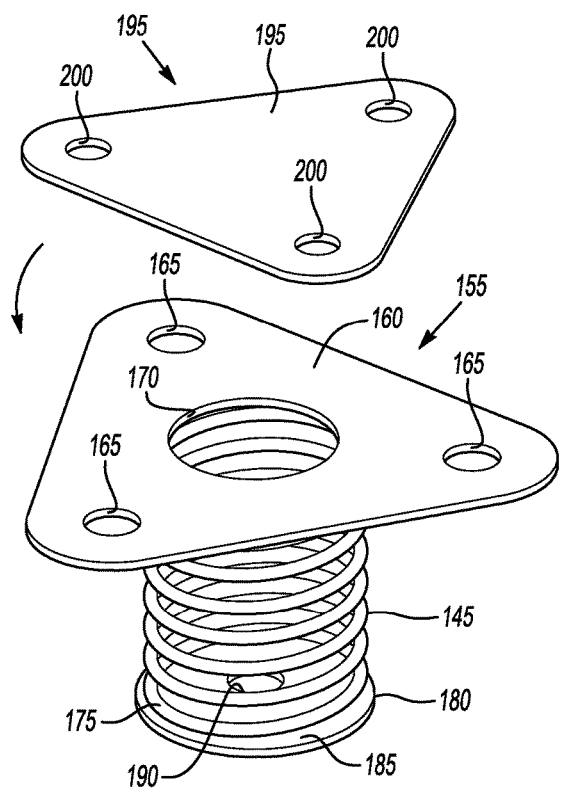
FIG. 4 is a view of the hanger assembly of FIGS. 2 and 3.

Referring now to FIGS. 2 and 4, coil spring 145 has a first end 150 that is attached to a casing plate 155 by welding or the like. The casing plate 155 has a body 160 that is show herein as triangularly shaped though other shapes may be appropriate. Casing plate 155 has a plurality of attachment holes 165 that align with the attachment holes 110 in the casing as will be discussed herein. The casing plate 155 has an orifice 170 that is located in a center area of the casing of the body 160 to allow access to the stud 135 and the bracket 117 as will be discussed herein.

The coil spring has a second end 175 attached to a bracket plate 180 by welding or the like. The bracket plate 180 has a circular shape 185 and a passageway 190 through which the stud 135 may protrude. A cover 195 has a shape that mimics the shape of the casing plate body 160 to minimize the number of attachment bolts required. The cover 195 has a plurality of attachment holes 200 that align with the attachment holes 110 in the casing 100 and the attachment holes 165 in the casing plate 155. The major opening 105 in the casing 100 has a greater diameter than the largest dimension the bracket plate 180 to enable the insertion of the back bracket plate 180 and the coil spring 145 through the major opening 105. The casing plate 155 has a greater area than the major opening 105 so that the casing plate may create a seal over the casing 100. Similarly, the cover 195 has a greater area than orifice 170 so that the cover may create a seal over the cover plate 155.

To assemble the apparatus, the bracket(s) 117 is riveted or the like to the liner 115 and the liner 115 is inserted into the casing so that the body 130 is in approximate registration with major opening 105. Registration may not be perfect because of manufacturing and part tolerances. The bracket plate 180 and the coil spring 145 are inserted through the major opening 105 until the bracket plate is in contact with the bracket 117 and the stud 135 extends radially outwardly through the passageway 190 in the bracket plate 180. Nut 205 is inserted through the orifice 170 of the coil spring 145, which acts as a hanger, and screwed lightly onto the stud 135. The casing plate 155 is then rotated until the attachment holes 165 are in register with the attachment holes 110 in the casing 100. The nut 205 is then torqued onto the stud 135.

The cover 195 is then placed over the casing plate 155. When the attachment holes 200 in the cover are in alignment with the attachment holes 165 in the casing plate 155 and the attachment holes 110 and the casing, a bolt 210 is then inserted through each set of holes 110, 165, 200 and secured thereto by nuts 215.

By placing the cover 195 over the casing plate 155, any air leaking through the orifice 170 is minimized. Because the casing plate is greater in area than the major opening, 105 leakage through the major opening 105 is minimized by the casing plate 155 and the cover 195. Any appropriate sealing material such as silicone may be placed between the cover 195 and the casing plate 155, and the between the casing plate 155 and the casing 100.

By utilizing a coil spring liner hanger assembly, build tolerances are accommodated in all directions, there is a minimal part count compared to other systems, there are no moving parts relative to each other, there is minimal leakage of air through the volume 140, thermal movement the liner 115 and the casing 100 is accommodated all directions, the hanger assembly acts in tension and compression, the coil spring 145 can be adapted for required loads in terms of hardness and flexibility, and no shimming or rigging is required during assembly.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method of supporting a liner of a gas turbine engine comprising:
   providing an exhaust liner that comprises a first duct and providing a second duct having an opening therein;
   spacing the first duct radially inward of the second duct;
   providing a spring to connect the first and second ducts together, the spring having a first end and a second end;
   providing a first mount comprising a first bracket portion associated with the spring and a second bracket portion directly fixed to the first duct;
   fixing the first bracket portion directly to the first end of the spring;
   fixing the second end of the spring to a second mount, the second mount comprising a casing plate having an area greater than the opening;
   inserting the first end of the spring and the first bracket portion through the opening;

attaching the first bracket portion to the second bracket portion; and directly fixing the casing plate to a radially outward facing surface of the second duct.

2. The method as recited in claim 1, wherein the first bracket portion comprises a bracket plate with a hole and the second bracket portion comprises a bracket body with a plurality of legs and at least one stud, and further comprising:

fixing the legs of the bracket body directly to the first duct; and inserting the bracket plate through the opening to receive the stud in the hole.

3. The method as recited in claim 2, further comprising:

providing the casing plate with a central aperture therethrough;

aligning the central aperture with the opening;

inserting a nut through the central aperture and the opening; and attaching the nut to the stud.

4. The method as recited in claim 3, further comprising:

covering the casing plate with a cover to minimize leakage through the central aperture.

5. The method as recited in claim 4, further comprising:

forming at least one first attachment hole in the cover;

forming at least one second attachment hole in the casing plate;

forming at least one third attachment hole in the second duct;

aligning the first, second, and third attachment holes; and inserting a fastener through the aligned first, second and third attachment holes.

6. The method as recited in claim 2, wherein the plurality of legs extend in one direction and the at least one stud extends in an opposite direction.

7. The method as recited in claim 1, wherein the spring defines a central axis and further comprising:

forming a volume for cooling air flow between an outer surface of the exhaust liner and an inner surface of the second duct;

assembling the first mount, the second mount, and the spring to provide a hanger assembly that supports the exhaust liner relative to the second duct such that the spring couples the first and second ducts together such that the first and second ducts are moveable relative to each other in a first direction along the central axis and are moveable relative to each other in a second direction transverse to the central axis.

8. The method as recited in claim 1, further comprising:

extending the spring in a radial direction across a cooling volume between the first and second ducts to connect the first and second ducts together.

9. The method as recited in claim 1, further comprising:

sealing the opening in the second duct after coupling the first and second ducts together with the spring.

10. The method as recited in claim 1, wherein the spring defines a central axis and further comprising:

providing a fan section with a plurality of fan blades rotatable about an engine axis;

providing a compressor section in communication with the fan section;

providing a combustor in fluid communication with the compressor section;

providing a turbine section in fluid communication with the combustor and driving the fan section and the compressor section; and locating the exhaust liner aft of the turbine section, wherein the exhaust liner includes an inner surface exposed to exhaust gases;

forming a volume for cooling air flow between an outer surface of the exhaust liner and an inner surface of the second duct; and assembling the first mount, the second mount, and the spring to provide a hanger assembly supporting the exhaust liner relative to the second duct such that the spring couples the first and second ducts together such that the first and second ducts are moveable relative to each other in a first direction along the central axis and are moveable relative to each other in a second direction transverse to the central axis.

* * * * *